(12) United States Patent
Frankel et al.

(10) Patent No.: US 7,068,873 B2
(45) Date of Patent: Jun. 27, 2006

(54) OPTICAL CROSS CONNECT APPARATUS AND METHOD

(75) Inventors: Michael Y. Frankel, Baltimore, MD (US); Joseph Berthold, Clarksville, MD (US)

(73) Assignee: Ciena Corporation, Linthicum, MD (US)

(*) Notice: Subject to any disclaimer, the term of this patent is extended or adjusted under 35 U.S.C. 154(b) by 216 days.

(21) Appl. No.: 10/662,353

(22) Filed: Sep. 16, 2003

(65) Prior Publication Data

US 2004/0062472 A1 Apr. 1, 2004

Related U.S. Application Data

(60) Provisional application No. 60/411,007, filed on Sep. 16, 2002.

(51) Int. Cl.
*G02B 6/26* (2006.01)
*H04J 14/00* (2006.01)

(52) U.S. Cl. ............... 385/16; 385/15; 385/17; 385/24; 398/50; 398/85

(58) Field of Classification Search ............... 385/24, 385/88, 89, 92, 15, 16, 17, 18; 398/79, 80, 398/82, 83, 59, 85, 56, 50
See application file for complete search history.

(56) References Cited

U.S. PATENT DOCUMENTS

| | | | |
|---|---|---|---|
| 5,694,499 A | 12/1997 | Tillerot et al. ............... 385/24 |
| 6,259,833 B1* | 7/2001 | Doerr et al. ............... 385/17 |
| 6,542,268 B1 | 4/2003 | Rotolo et al. ............... 385/128 |
| 6,556,321 B1 | 4/2003 | Milton et al. ............... 359/124 |
| 6,631,018 B1* | 10/2003 | Milton et al. ............... 398/59 |

OTHER PUBLICATIONS

International Search Report dated Jun. 4, 2004, for PCT/US03/28757.

* cited by examiner

*Primary Examiner*—Brian M. Healy
(74) *Attorney, Agent, or Firm*—Merek, Blackmon & Voorhees, LLC

(57) ABSTRACT

A new architecture is proposed for making optical cross connect in wavelength division multiplexed networks. The value of optical networks incorporating all-optical cross connects is typically associated with being able to selectively route individual channel wavelengths through several network nodes without performing optical-electrical and electrical-optical conversion. From a network perspective, most work on the optical cross connect architectures have been concentrated on the highest possible capability for the cross-connect itself. The problem with considering optical cross connect architectures in isolation without attention to the rest of the network may lead to unnecessarily complicated hardware. In the proposed architecture, architecture considers the network as a whole and significant cost reductions as well as complexity reductions are realized.

26 Claims, 8 Drawing Sheets

OPTICAL CROSS CONNECT APPARATUS AND METHOD

PROVISIONAL APPLICATION

The present application claims priority under 35 U.S.C. § 120 of a provisional application 60/411,007 filed on Sep. 16, 2002, the entirety of which is hereby incorporated by reference.

FIELD OF THE INVENTION

The field of the invention generally relates to optical cross connects, methods of forming optical cross connects, and related optical networking architectures and methods. More particularly, the invention relates to a new architecture and method for an optical cross connect that is particularly useful in wavelength division multiplexed networks.

BACKGROUND OF THE INVENTION

The value of optical networks incorporating all-optical cross connects (OCC) is typically associated with being able to selectively route individual channel wavelengths through several network nodes without performing optical-electrical and electrical-optical conversion.

From a network perspective, most research on the OCC architectures have been concentrated on the highest possible capability for the cross-connect itself. For example, switch architectures with single wavelength granularity and fully non-blocking capability are considered indispensable to optical networks and have, therefore, been a subject of intense research. The term "non-blocking" refers to an ability of the optical switch to direct any spectral input to any output without precluding (or "blocking") any of the possible connections for other spectral inputs and outputs.

Typical OCC designs include:
(i). a spectral DEMUX on each input fiber, followed by a space-division switch, followed by a MUX or combiner to direct the selectively-switched wavelengths to output fibers;
(ii). a passive splitter after each input fiber, an optical filter on each split path, a space-division switch, followed by a combiner to direct filtered and selectively switched wavelengths to output fibers; and
(iii). a passive splitter after each input fiber, a filter on each split path, and a combiner to direct filtered wavelengths to output fibers.

FIG. 1 illustrates a conventional "broadcast and select" OCC apparatus 100 of architecture of (iii) as described. In particular, FIG. 1 illustrates a fully non-blocking OCC. In this OCC architecture, N*(N−1) filters are required for cross-connecting N diverse routes.

The conventional OCC apparatus 100 includes a plurality of optical inputs 102 a plurality of optical outputs 104. The conventional OCC apparatus 100 apparatus also includes local cross-connect 110 used for cross connecting the optical inputs 102 and outputs 104 so that optical signals flowing into the optical inputs 102 are directed to the appropriate optical outputs 104.

The local cross-connect 110 itself includes a plurality of optical couplers 106 and a plurality of optical filters 120 optically placed between each connected pair of optical couplers 106. As seen, depending on the placement, each optical coupler 106 performs one of two functions—splitting the incoming optical signal for outputting to other optical coupler or combining optical signals from other optical couplers and outputting the outgoing optical signal.

In the example shown in FIG. 1, there are 4 diverse routes. Cross-connecting the 4 routes requires 12 optical filters. Increasing the route by one to total 5 requires eight additional filters to total 20. In short, the fabric of the conventional OCC architecture requires N*(N−1) filters. In other words, the increase is quadratic.

Generally, the conventional OCC architectures have optical signal flows that may be described as follows:
(1) split the incoming optical signal;
(2) perform optical filtering and/or switching; and
(3) recombine optical signals into output filters.

This is shown in FIG. 1 where there is an optical filter 120 after each split and before each recombine. Such design necessarily constrains the OCC to an effectively "localized" architecture since the optical processing is sandwiched between the splitter and combiner functions. Localization occurs when all of the optical switch components are required to be located at a single physical location in the network.

This localization, while perhaps enabling to maximize the capability of the OCC node itself, may not be required or needed for the network, which the OCC node is a part of, as a whole. Further, it may lead to unnecessarily complicated hardware and connections that make up the network, thereby increasing its cost.

BRIEF DESCRIPTION OF THE DRAWINGS

Features of the present invention will become more fully understood to those skilled in the art from the detailed description given hereinbelow with reference to the drawings, which are given by way of illustrations only and thus are not limitative of the invention, wherein.

DETAILED DESCRIPTION

For simplicity and illustrative purposes, the principles of the present invention are described by referring mainly to exemplary embodiments thereof. The same reference numbers and symbols in different drawings identify the same or similar elements. Also, the following detailed description does not limit the invention. The scope of the invention is defined by the claims and equivalents thereof.

The expression "optically communicates" as used herein refers to any connection, coupling, link or the like by which optical signals carried by one optical element are imparted to the "communicating element." Such "optically communicating" devices are not necessarily directly connected to one another and may be separated by intermediate optical components and/or devices. Likewise, the expressions "connection", "operative connection", and "optically placed" as used herein are relative terms and do not necessarily require a direct physical connection.

In general, an aspect of the present invention may be described having optical flows in different sequence as compared to the conventional optical cross-connection apparatus as follows:

(1) optical filtering one or more input optical signals, while still keeping filtered signal in a single transmission medium;
(2) cross-connecting between one or more inputs and one or more outputs; and
(3) optical filtering one or more output optical signals.

The cross connecting may be performed in a spectrally transparent manner. This process "localizes" only the cross-connection function and the optical filtering may be removed from the cross-connect. The optical filtering may be performed at the apparatus itself, by other nodes in the network, or not at all. Because the optical filtering is not constrained to the OCC, the filtering functionality becomes "distributed" on the network. The entire network may be considered to thereby increase efficiency and performance and reduce complications and costs.

Figure 2:
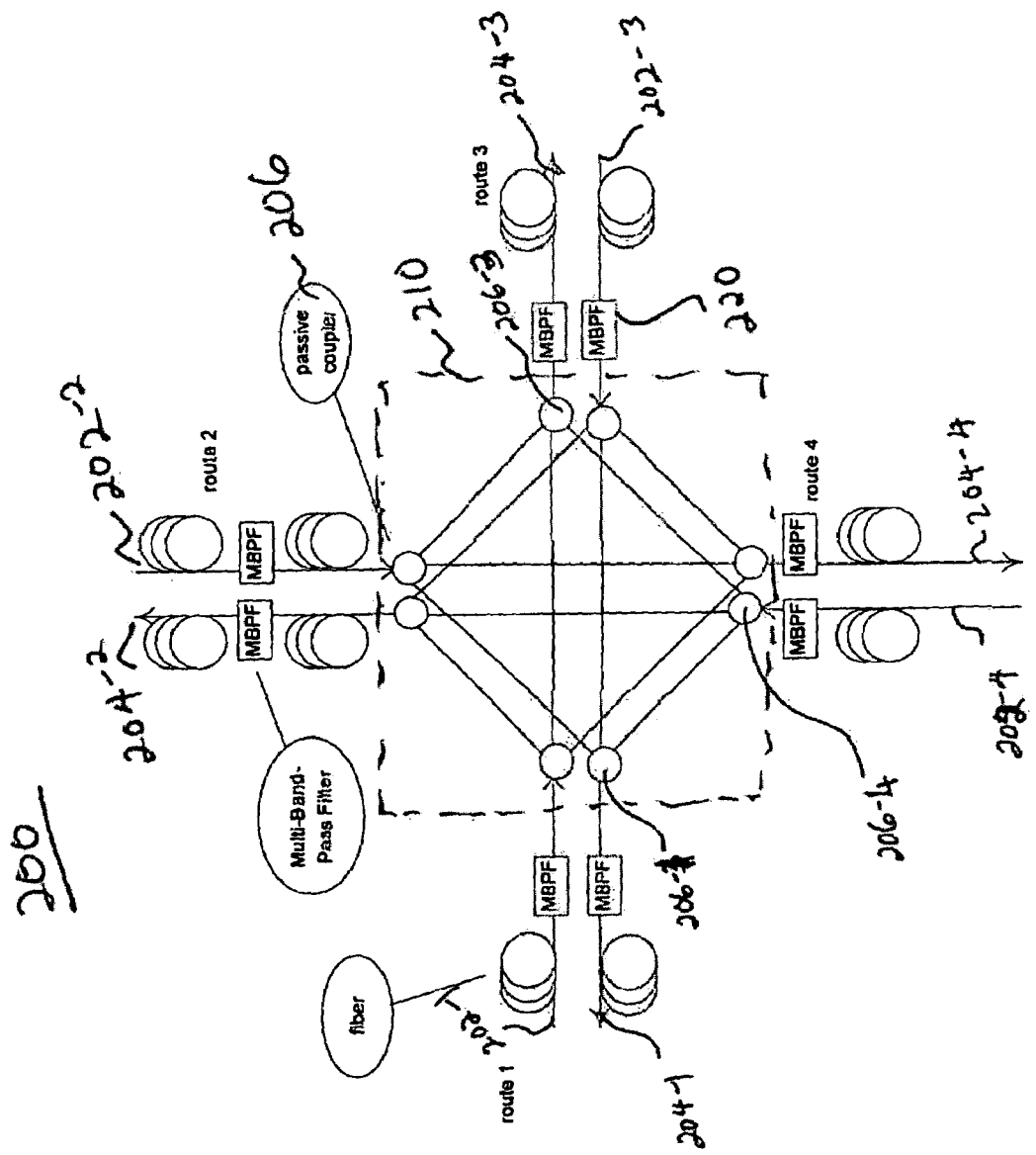
FIG. 2 is a block diagram illustrating an optical cross connect architecture according to an embodiment of the present invention.

FIG. 2 is a block diagram illustrating an optical cross-connect apparatus 200 according to an embodiment of the present invention. As shown, the optical cross-connect apparatus 200 may include a plurality of optical inputs 202-$n$, a plurality of optical outputs 204-$n$, an OCC 210 provided between the plurality optical inputs 202-$n$ and outputs 204-$n$, and a plurality of optical filters 220 provided outside of the OCC 210. In this instance, n is from 1 to 4 for each of the routes, but it should be understood that the number of routes is not so limited.

By providing the optical filters 220 outside of the OCC 210, only the cross-connection function is localized as noted above. The example in FIG. 2 shows that between each optical input 202-$n$ and the OCC 210 and also between each optical output 204-$n$ and the OCC 210, an optical filter 220 is optically placed. Thus, FIG. 2 is an example of optical filtering (or processing) taking place within the optical cross-connect apparatus 200 itself.

However, it is to be understood that the optical cross-connect apparatus 200 is not so limited. While FIG. 2 illustrates so, it is not necessary that an optical filter 220 be optically connected to each and every optical input 202-$n$ and output 204-$n$ within the apparatus. Indeed, it is not necessary to have any optical filters within the apparatus 200 at all. As indicated above, optical filtering may be performed by other nodes in the network (i.e "distributed") or not at all.

The OCC 210 may be spectrally transparent. In other words, the OCC 210 itself does not perform any spectrum (wavelength) blocking functions. If blocking functions are desired or required, they may be performed by appropriately placing one or more optical filters 220, either within the apparatus 200 or within the network outside of the apparatus 200.

The OCC 210 may include a plurality of optical couplers 206-$m$ appropriately placed and connected to perform optical splitting and combining functions so that optical signals may be directed as desired. One or more of the optical couplers 206-$m$ may be passive optical couplers. It is to be noted that m is 1 to the actual number of couplers within the OCC 210 (in this instance, 8) to uniquely identify each coupler. For brevity and for ease of explanation, not all optical couplers are so numbered.

Figure 7A:
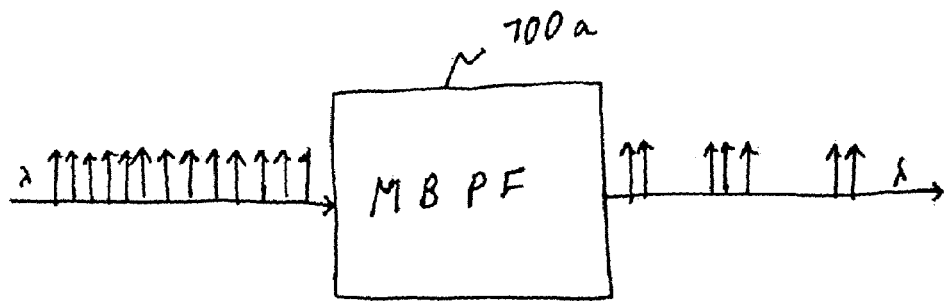
FIGS. 7a–b are block diagrams illustrating different embodiments of multi-band-pass filters according to the present invention.
Figure 7B:
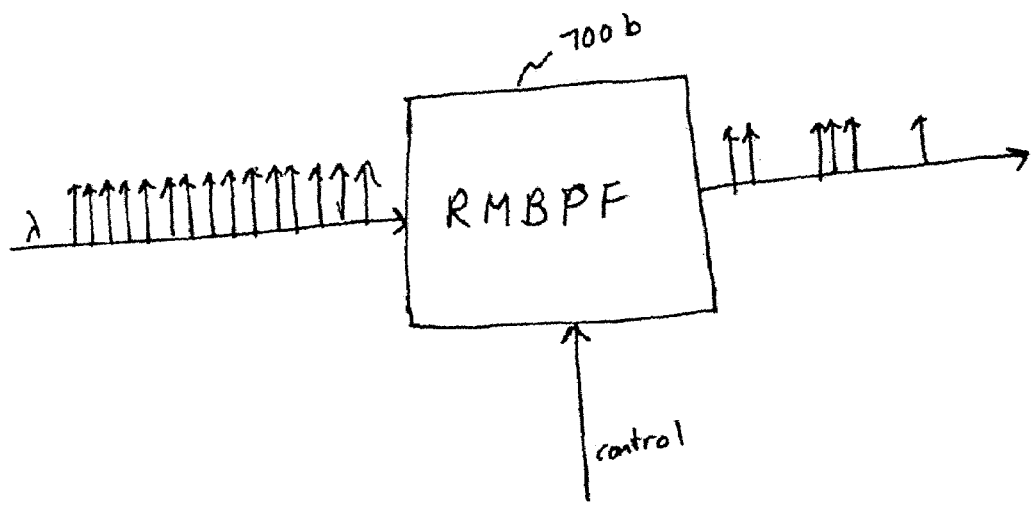

Also, one or more of the optical filters 220 may be a multi-band-pass type filter 700$a$ as shown in FIG. 7$a$. As shown, the multi-band-pass filter (MBPF) 700$a$ receives as optical input a spectrum of wavelengths represented by the symbol $\lambda$. These wavelengths may be viewed as a single optical channel or bands of optical channels where each channel is capable of carrying separate optical information. The MBPF 700$a$ blocks a subset of the channels and outputs the remainder (or complementary set) of the channels of the spectrum. FIG. 7$b$ illustrates a reconfigurable MBPF (RMBPF) 700$b$ wherein the particular channel or channels blocked may be chosen through control signals. A description of a particular type of RMBPF may be found in a provisional application 60/410,996, filed on Sep. 16, 2002 by the common Assignee of the present application and is hereby incorporated by reference in its entirety.

When the optical filtering function takes place outside the optical cross-connect fabric such as shown in FIG. 2, the maximum number of optical filters required is 2*N for cross-connecting N diverse routes. In other words, the increase is order N, i.e. linear. This makes increasing the number of routes for a cross-connect more practical, which in turn enables more cost-effective and capable networks to be designed.

Figure 8:
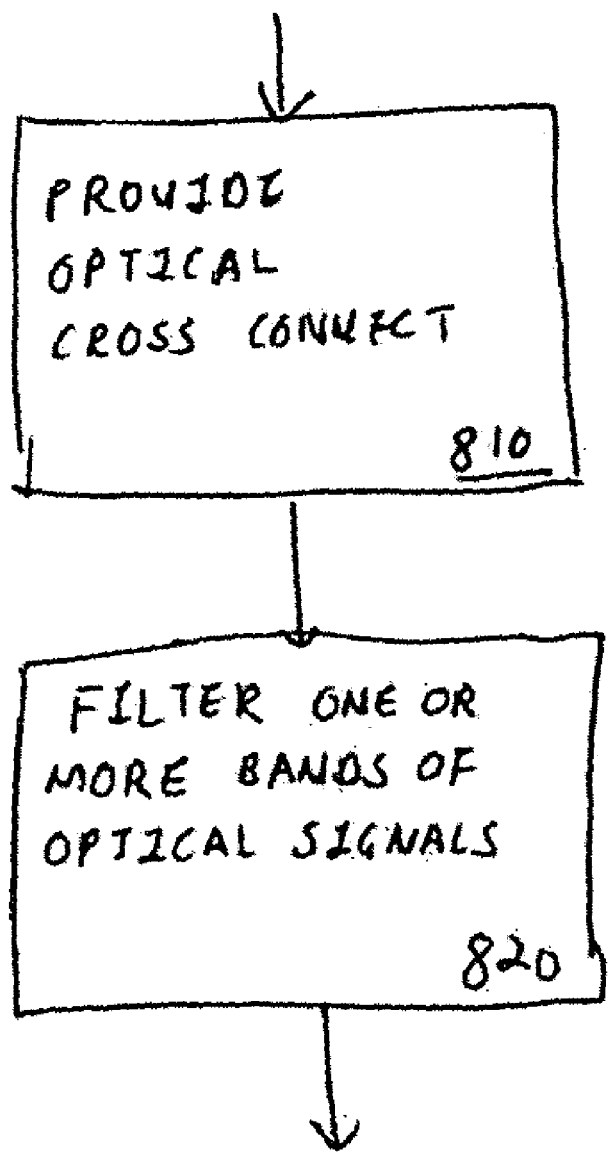
FIG. 8 illustrates a method of cross-connecting a plurality of optical inputs and outputs according to an embodiment of the present invention.

A method of cross-connecting the plurality of optical inputs 202-$n$ and plurality of optical outputs 204-$n$ may be described as follows. FIG. 8 illustrates an embodiment of such a method. As shown, the method 800 may include a step 810 of providing an optical cross-connect between a plurality of optical inputs. The method 800 may also include a step 820 of optically filtering at least one optical channel of an optical signal flowing into at least one of the inputs or flowing out of at least one of the outputs or both. The optical cross-connect may be spectrally transparent and filtering may be channel or band-pass filtering.

An embodiment of the optical cross-connect apparatus may be described as follows. Referring back to FIG. 2, it is noted that the optical cross-connect 210 forms paths between the optical inputs 202-$n$ and outputs 204-$n$. For example, the optical couplers 206-4 and 206-3 enables a path (or connection) to be formed between the optical input 202-4 and the optical output 204-3. Likewise, the optical couplers 206-4 and 206-1 enables another path to be formed between the optical input 202-4 and the optical output 204-1. In the example illustrated in FIG. 2, a path is formed between each optical input 202-$n$ and each optical output 204-$n$. However, it is not necessary that a path be formed for each and every pair of optical inputs 202-$n$ and outputs 204-$n$.

Also in the example illustrated in FIG. 2, the plurality of optical filter 220 is provided outside the cross-connect 210 such that each path is filtered at its input and output. However, it is not necessary that each path be filtered at both input and output. Indeed, it is not necessary that any of the paths within the apparatus 200 be filtered at all. This is because optical filtering may be performed by other nodes in the network or not at all. If it is desired that each path be filtered within the apparatus 200, either the input of the path or the output of the path or both may be filtered.

Figure 3:
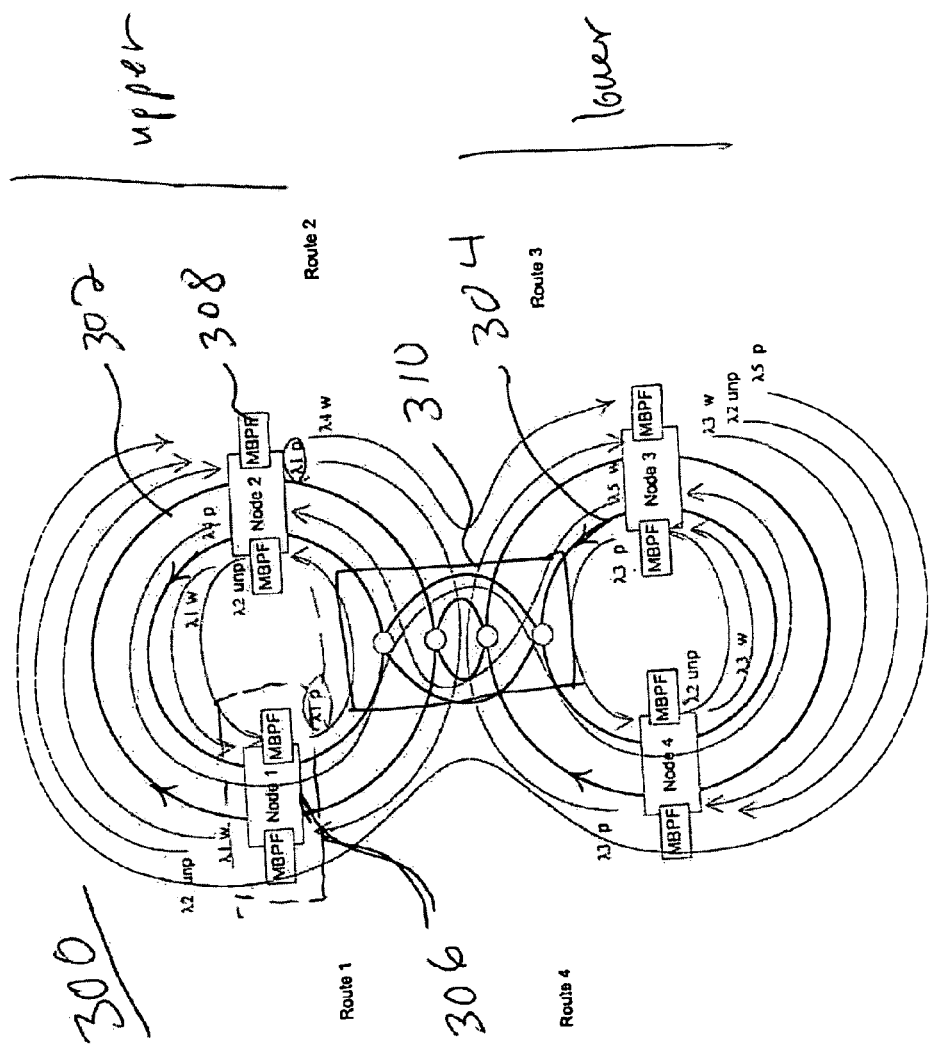
FIG. 3 is a block diagram illustrating an optically cross-connected fiber ring network according to an embodiment of the present invention.

FIG. 3 is a block diagram illustrating an optically cross-connected fiber ring network 300 according to an embodiment of the present invention. Subsequent description refers to single wavelengths ($\lambda 1$, $\lambda 2$, etc.) for ease of explanation, but it is to be understood that the same could be taken as specific wavelength bundles or bands.

The network 300 may include an outer ring 302 and an inner ring 304. The outer ring 302 carries optical signals in a clockwise direction and the inner ring 304 carries optical signals in a counter-clockwise direction, but they can be vice versa. The network 300 may also include an optical cross-connect apparatus 310, of the type illustrated in FIG. 2. The apparatus 310 enables outer-to-out and inner-to-inner connections. While not shown, it is to be understood that other connections are possible, such as outer-to-inner and inner-to-outer.

Figure 1:
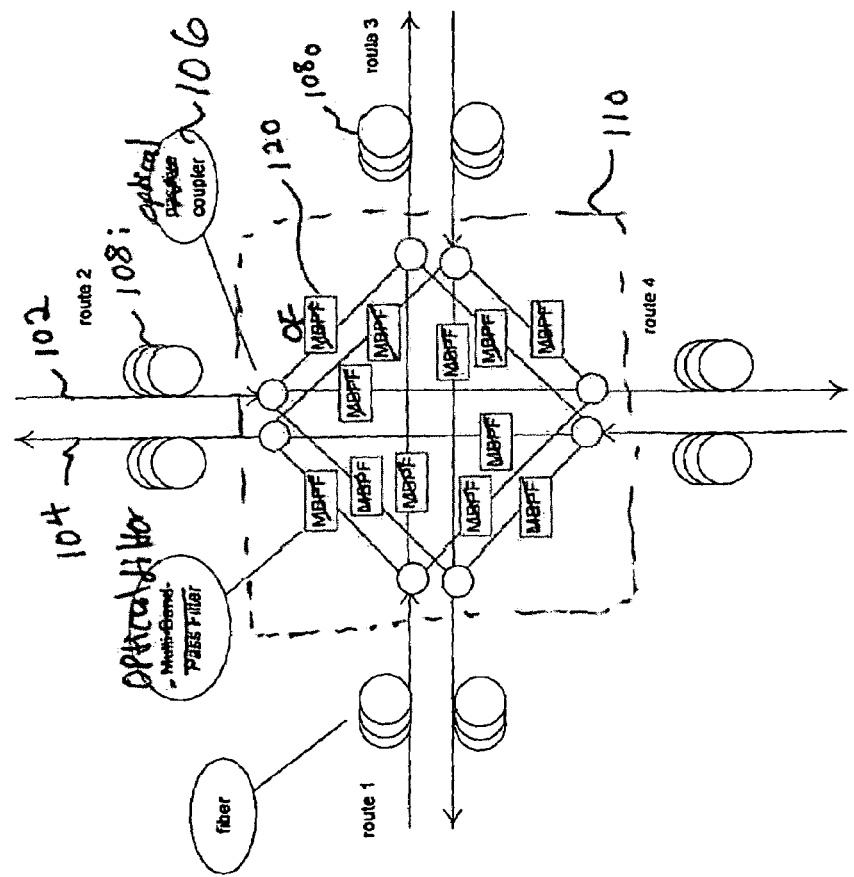
FIG. 1 is a block diagram illustrating a conventional optical cross connect architecture.

If a conventional optical cross-connect apparatus such as illustrated in FIG. 1 is used, such a cross-connection would require 12 optical filters for a fully populated OCC resulting in a more complicated hardware. In this embodiment, no optical filters are required at the apparatus 310. The optical filtering may be absorbed or moved to adjacent ring nodes 306 as shown. It may be the case that one or more optical filters 308 are required for other purposes regardless, and this embodiment allows efficient utilization of the existing filters. Of course, the optical cross connect apparatus 310 may also include optical filters as well.

While not explicitly shown in FIG. 3, a control component may be included. More specifically, the optical filters 308 may be controlled so as to reconfigurably block/pass desired channel or groups of channels. A conventional service channel, overlay IP network, DCC or other communication means may be used to communicate administrative, maintenance, and control information to further enable such a functionality.

In addition, the embodiment illustrated in FIG. 3 supports optically protected intra-ring connections such as $\lambda 1$ and $\lambda 3$. The subscripts "w", "p", and "unp" refer to working, protected, and unprotected wavelength channels, respectively. It should be noted that protected wavelength cannot be reused among rings. For example, $\lambda 1p$ and $\lambda 3p$ are used only in the upper rings and the lower rings, respectively. Unprotected intra-ring connections may reuse wavelengths. For example, $\lambda 2unp$ is used in both upper and lower rings.

The same holds true for inter-ring connections where full optical protection requires that 2 wavelengths be used ($\lambda 4$ and $\lambda 5$) in this example. Unprotected connection can still be accomplished with a single wavelength.

In networks that have wavelength-addressable nodes (i.e. a node that has a unique set of wavelengths associated with it), for example the networks that support laser-wavelength connectivity, the above compromise on wavelength reuse is removed. The bandwidth limitation would be the same regardless of the particular OCC architecture.

Figure 4:
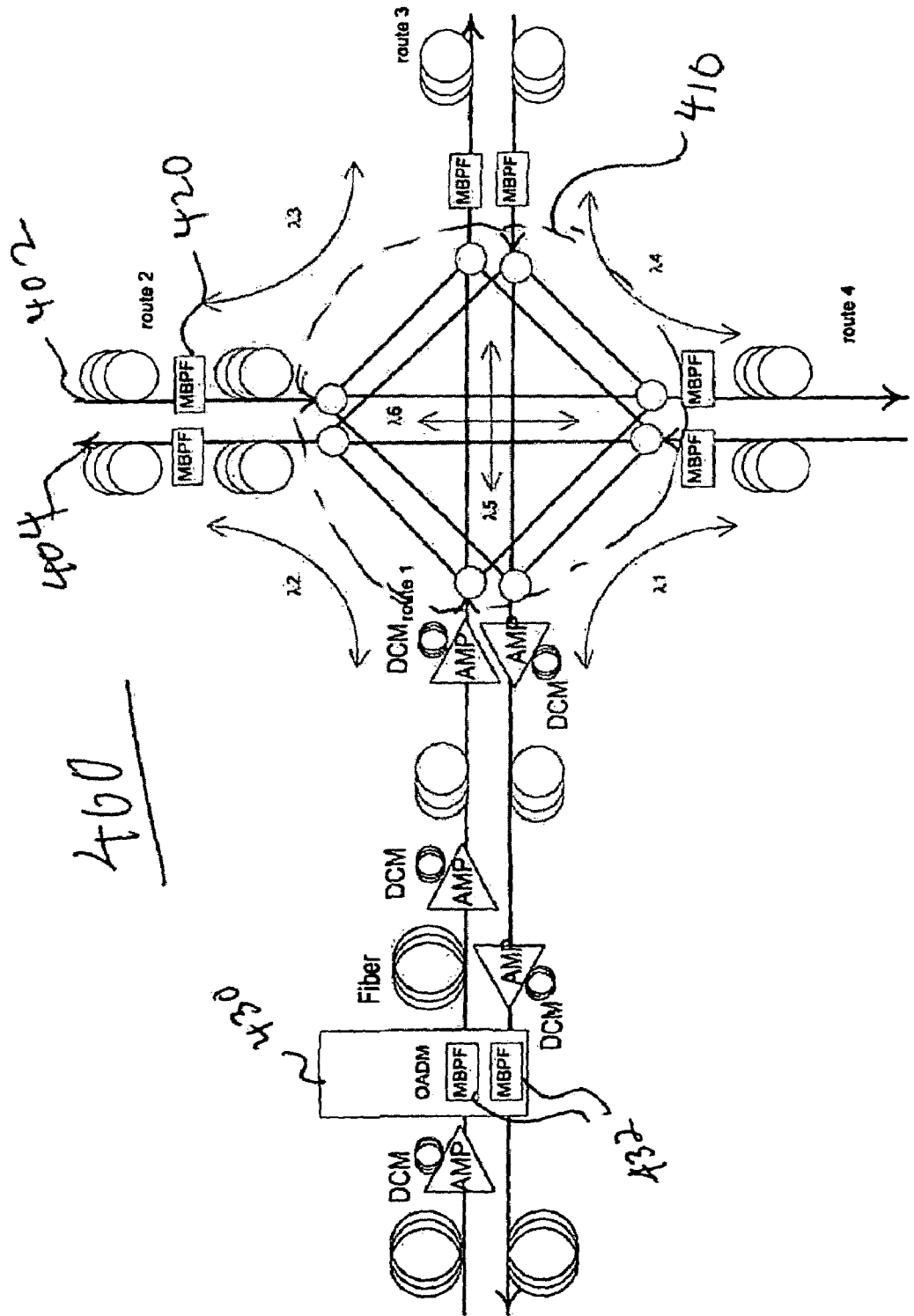
FIG. 4 is a block diagram illustrating a mesh-type optical cross connect network according to an embodiment of the present invention.

FIG. 4 is a block diagram illustrating a mesh-type optical cross connect network 400 according to an embodiment of the present invention. As shown, the network 400 may include a plurality of optical inputs 402, a plurality of outputs 404, an optical cross-connect 410, a plurality of optical filters 420, and an optical add/drop module (OADM) 430 with its own optical filters 432. As connected, route 1 is part of a linear optical subnetwork. In this example, the OADM 430 includes first and second optical filters 432 optically connected to an optical input 402 and to an optical output 404, respectively.

In this view, the total bandwidth required to be accessible by the optical transport system is the sum of all bandwidth connections. Conventional OCC require total bandwidth to be maximum of the sum at each route independently. At a first glance, the network 400 may appear to be wasteful when compared to the conventional OCC. However, the following points should be noted:

1. The bandwidth utilization differences between distributed and conventional architectures decrease as interconnect traffic become more asymmetric.
2. If each bi-directional connection is required to be made with same wavelengths (same channels), conventional OCC is penalized and becomes identical to some embodiments of the present invention.
3. The bandwidth that is not used for route interconnection at an OCC can be still recovered and used for "local" intra-route connections.
4. As route demand exceeds a single line system capacity, a parallel line system may need to be turned up. This increases the degree of all nodes along that route by one, thus increasing their complexity. Regardless of the OCC architecture, this produces substantial wavelength blocking.

Figure 5:
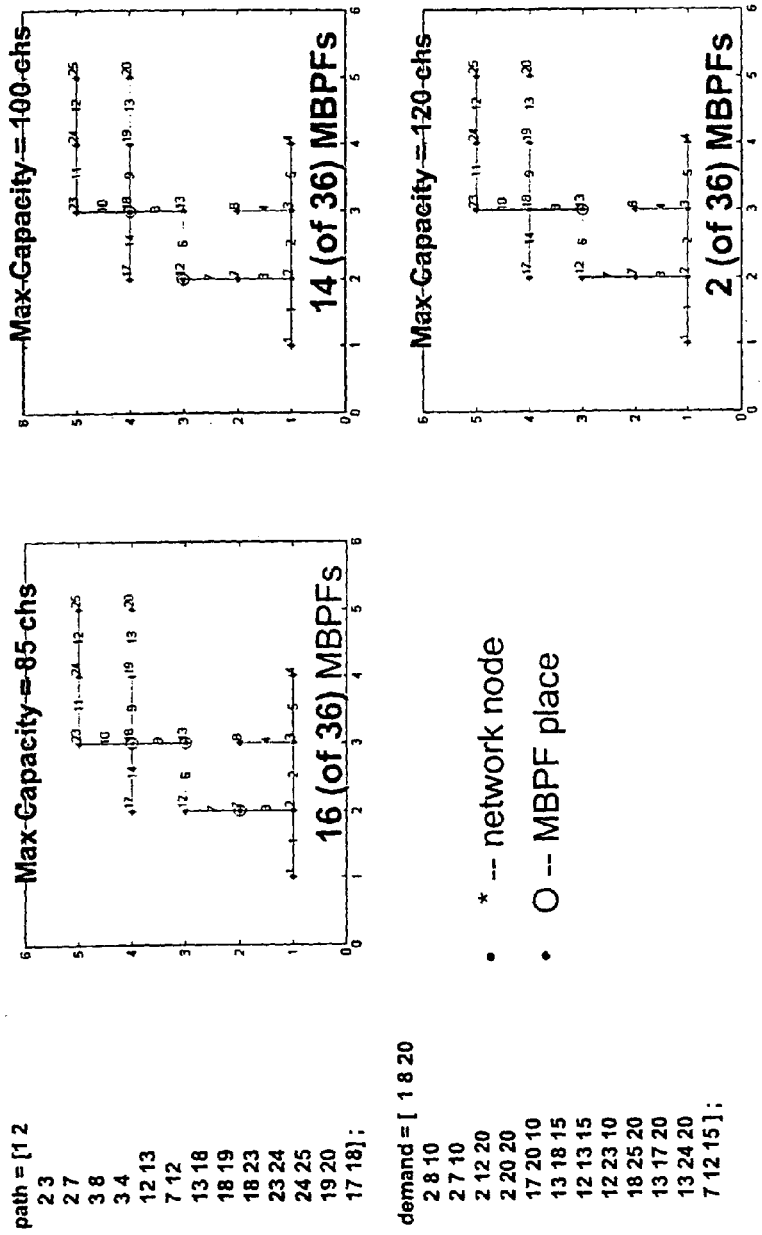
FIG. 5 is a series of illustrations demonstrating how the multi-band-pass filter count drops as model network's transport system capacity increases by applying an embodiment of a technique of the present invention.
Figure 6:
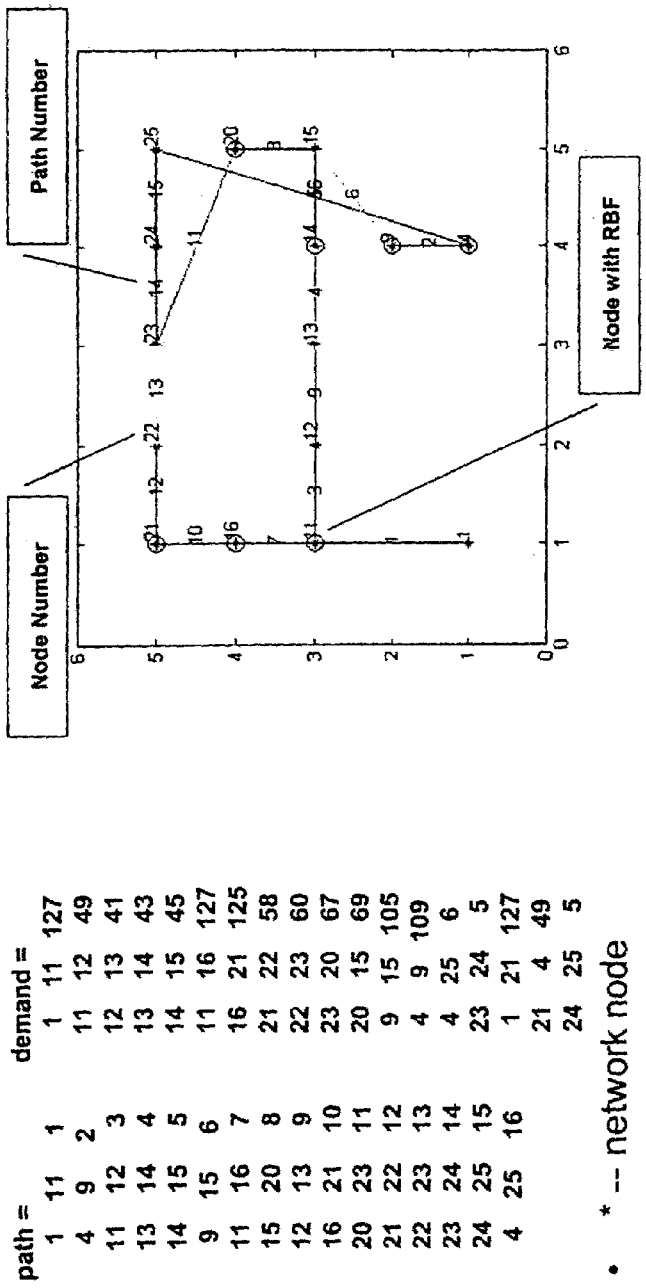
FIG. 6 is a series of illustrations demonstrating how the multi-band-pass filter count drops as an actual example network's transport system capacity increases by applying an embodiment of a technique of the present invention.

FIGS. 5 and 6 illustrate two example networks that illustrate that optical filtering can be approached in a "distributed" fashion according to various embodiments of the present invention. Rather than consider each OCC node in isolation, optical filter locations are determined based on the total network topology and traffic demands. Thus, optical filtering becomes distributed. These figures illustrate the considerable simplification of OCC nodes, which thereby reduces network costs. It should be noted that as the line system capacity increases, the network requirement for wavelength reuse decrease, corresponding to a decreased number of required MBPF modules.

Referring to FIGS. 5 and 6, each node in the network is uniquely numbered, and shown by a "*" on the plots. A PATH lists node pairs that have physical connectivity between each other, which is also shown by solid lines on the network plots. A DEMAND lists two node numbers and a total traffic channel demands flowing between these two nodes. It should be noted that physical PATHs and DEMANDs are independent. Circle on the plots indicate nodes that contain optical filters (MBPF). The results illustrate that as the capacity of the optical transmission systems increase, networks need progressively decreasing numbers of optical filters. Generally, optical filters allow for spectral re-use in a network, which is only needed if total network traffic demand exceeds transmission system capacity.

While the invention has been described with reference to the exemplary embodiments thereof, it is to be understood that various modifications may be made to the described embodiments without departing from the spirit and scope of the invention thereof. The terms as descriptions used herein are set forth by way of illustration only and are not intended as limitations.

What is claimed is:

1. An optical cross-connect apparatus, comprising:
   a plurality of optical inputs;
   a plurality of optical outputs;
   an optical cross-connect defining a plurality of optical cross-connect paths between said plurality of optical inputs and said plurality of optical outputs;
   at least one optical filter provided outside of said cross-connect, said at least one optical filter filtering at least one optical channel of an optical signal flowing into at least one of said plurality of optical inputs or filtering at least one optical channel of an optical signal flowing out of at least one of said plurality of optical outputs or both; and wherein at least one of said plurality of optical cross-connect paths does not have a filter within said cross-connect in optical communication therewith.

2. The optical cross-connect apparatus of claim 1, wherein said optical cross-connect includes:

optical splitters optically coupled to said optical inputs; and optical combiners optically coupled to said optical outputs, wherein said optical splitters are optically coupled to said optical combiners in a broadcast and combine arrangement.

3. The optical cross-connect apparatus of claim 2, wherein each optical input is optically coupled to a respective one of said optical splitters and each optical output is optically coupled to a respective one of said optical combiners.

4. An optical cross-connect apparatus, comprising:

a plurality of optical inputs;

a plurality of optical outputs;

an optical cross-connect provided between said plurality of optical inputs and said plurality of optical outputs; and at least one optical filter provided outside of said cross-connect, said at least one optical filter filtering at least one optical channel of an optical signal flowing into at least one of said plurality of optical inputs or filtering at least one optical channel of an optical signal flowing out of at least one of said plurality of optical outputs or both;

wherein there are no optical filters included within said optical cross-connect.

5. The optical cross-connect apparatus of claim 1, wherein the optical cross-connect is spectrally transparent.

6. The optical cross-connect apparatus of claim 1, wherein at least one of said plurality of optical filters is a multi-band-pass filter.

7. The optical cross-connect apparatus of claim 1, wherein at least one of said plurality of optical filters is a reconfigurable multi-band-pass filter.

8. The optical cross-connect apparatus of claim 1, wherein said optical cross-connect includes a plurality of optical couplers.

9. The optical cross-connect apparatus of claim 1, wherein at least one of said plurality of optical couplers is a passive optical coupler.

10. A method of optimizing a cross-connect apparatus by reducing the number of filters required for cross connecting a plurality of optical inputs and a plurality of optical outputs, the method comprising:

providing an optical cross-connect between the plurality of optical inputs and the plurality of optical outputs;

optically filtering at least one optical channel of an optical signal flowing into at least one of said plurality of optical inputs or at least one optical channel of an optical signal flowing out of at least one of said plurality of optical outputs or both, thereby obviating the requirement of optically filtering said at least one optical channel within said optical cross-connect; and providing a signal from said at least one optical input to at least one optical output without filtering said signal within said optical cross-connect.

11. The method of claim 10, further including the steps of providing a signal from each of said plurality of optical inputs to each of said plurality of optical outputs without filtering any of said signals within said optical cross-connect.

12. The method of claim 10, wherein said optically filtering step includes multi-band-pass filtering at least one optical channel of an optical signal flowing into at least one of said plurality of optical inputs or at least one optical channel of an optical signal flowing out of at least one of said plurality of optical outputs or both.

13. An optical cross-connect apparatus, comprising:

a plurality of optical inputs;

a plurality of optical outputs;

an optical cross-connect provided between said plurality of optical inputs and said plurality of optical outputs such that paths are formed between a subset of said plurality of optical inputs and a subset of said plurality of optical outputs, wherein a path is defined as a connection between a particular optical input and a particular output;

at least one optical filter provided outside of said cross-connect such that for each one path that exists between a particular optical input and a particular optical output, the path's input is filtered or the path's output is filtered or both; and wherein at least one of said paths does not have a filter within said cross-connect in optical communication therewith.

14. The optical cross-connect apparatus of claim 13, wherein said optical cross-connect includes:

optical splitters optically coupled to said optical inputs; and optical combiners optically coupled to said optical outputs, wherein said optical splitters are optically coupled to said optical combiners in a broadcast and combine arrangement.

15. The optical cross-connect apparatus of claim 14, wherein each optical input is optically coupled to a respective one of said optical splitters and each optical output is optically coupled to a respective one of said optical combiners.

16. The optical cross-connect apparatus of claim 13, wherein there are no optical filters included within said optical cross-connect.

17. The optical cross-connect apparatus of claim 13, wherein substantially all of the paths do not have a filter within said cross-connect in optical communication therewith.

18. The optical cross connect apparatus of claim 13, wherein each path is filtered and the total number of filters is equal to twice the number of paths.

19. The optical cross connect apparatus of claim 13, wherein there are N paths, wherein each path is filtered and wherein the total number of filters is less than $N*(N-1)$.

20. A fiber ring network, comprising:

a first and second outer rings carrying optical signals in a first direction;

a first and second inner rings carrying optical signals in a second direction opposite the first direction;

an optical cross-connect apparatus as claimed in claim 1 for providing for at least an outer-to-outer connection between the first and second outer rings and an inner-to-inner connection between said first and second inner rings; and wherein there are no optical filters within said optical cross-connect apparatus, said network further comprising at least one adjacent ring node optically placed in a path of one or more of said first and second outer rings and first and second inner rings such that said adjacent ring node performs an optical filtering function.

21. The fiber ring network of claim 20, wherein said adjacent ring node includes a multi-band-pass filter.

22. A mesh network, comprising:
an optical cross-connect apparatus as claimed in claim 1; and
an optical add/drop module optically connected to one of said plurality of optical inputs and to one of said plurality of optical outputs.

23. The mesh network of claim 22, wherein the optical add/drop module includes a first and second multi-band-pass filters.

24. The mesh network of claim 23, said first and second multi-band-pass filters are optically connected to said one of said plurality of optical inputs and to said one of the plurality of said optical outputs, respectively.

25. The optical cross-connect apparatus of claim 13, wherein each path has a unique optical input filter and optical output filter filtering only that path.

26. The optical cross-connect apparatus of claim 2, wherein there are no optical filters within the optical coupling between said optical splitters and said optical combiners.

* * * * *